· US009645912B2

(12) United States Patent
Dubinsky et al.

(10) Patent No.: US 9,645,912 B2
(45) Date of Patent: May 9, 2017

(54) IN-PLACE FUNCTION MODIFICATION

(75) Inventors: Leonid Dubinsky, Redmond, WA (US); Jean-Francois Peyroux, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1347 days.

(21) Appl. No.: 12/325,436

(22) Filed: Dec. 1, 2008

(65) Prior Publication Data

US 2010/0138817 A1    Jun. 3, 2010

(51) Int. Cl.
G06F 9/44      (2006.01)
G06F 9/45      (2006.01)
G06F 15/16     (2006.01)
G06F 11/36     (2006.01)

(52) U.S. Cl.
CPC ................................ *G06F 11/3644* (2013.01)

(58) Field of Classification Search
CPC ............. G06F 11/3644; G06F 11/3664; G06F 9/45516; G06F 9/4425; G06F 8/48
See application file for complete search history.

(56) References Cited

U.S. PATENT DOCUMENTS

| | | | |
|---|---|---|---|
| 5,596,702 A * | 1/1997 | Stucka et al. | 715/746 |
| 6,308,320 B1 * | 10/2001 | Burch | 717/154 |
| 6,397,378 B1 * | 5/2002 | Grey et al. | 717/175 |
| 6,405,316 B1 | 6/2002 | Krishnan et al. | |
| 6,484,276 B1 | 11/2002 | Singh et al. | |
| 7,178,131 B2 * | 2/2007 | Mitchell et al. | 717/124 |
| 7,219,329 B2 * | 5/2007 | Meijer | G06F 9/45516 717/106 |
| 7,275,241 B2 * | 9/2007 | Choi et al. | 717/143 |
| 7,293,260 B1 * | 11/2007 | Dmitriev | 717/130 |
| 7,367,015 B2 * | 4/2008 | Evans | G06F 8/48 714/E11.21 |
| 7,404,107 B2 | 7/2008 | Burk | |
| 7,458,072 B2 * | 11/2008 | Moorthy | G06F 9/4425 712/E9.082 |

(Continued)

OTHER PUBLICATIONS

"Microsfot Computer Dictionary 5th Edition", Microsoft Corporation, 2002, pp. 79, 280, 293-294, and 339.*

(Continued)

*Primary Examiner* — Thuy Dao
(74) *Attorney, Agent, or Firm* — Fiala & Weaver P.L.L.C.

(57) ABSTRACT

Modifying computer program code can be performed at or immediately prior to runtime of the computer code in a runtime environment of a common language infrastructure of a language-neutral framework for developing and executing computer applications. A function in a computer program can be modified at runtime by injecting arbitrary code, while mitigating an alteration of a program's call stack. A just-in-time compilation service is used to compile and execute intermediate language code of the program, and the runtime environment sends callback functions to an event-based profiling agent (profiler) attached to the runtime environment. The profiler can trap desired functions, as determined by configuration data, and inject modification code from stub methods in a stub assembly file. The modified code can be sent back to the runtime environment to be executed by the just-in-time compilation service.

20 Claims, 8 Drawing Sheets

(56) References Cited

U.S. PATENT DOCUMENTS

| | | | |
|---|---|---|---|
| 7,593,980 B2* | 9/2009 | Marascio | G06F 11/3664 379/229 |
| 7,805,717 B1* | 9/2010 | Spertus et al. | 717/158 |
| 7,823,137 B2* | 10/2010 | Chagoly et al. | 717/130 |
| 7,827,541 B2* | 11/2010 | Chen et al. | 717/130 |
| 7,890,929 B1* | 2/2011 | Johanson | 717/114 |
| 7,913,240 B2* | 3/2011 | Kielstra | G06F 9/45516 717/147 |
| 8,108,848 B2* | 1/2012 | Meijer | G06F 9/4425 707/713 |
| 8,176,480 B1* | 5/2012 | Spertus | 717/158 |
| 8,291,393 B2* | 10/2012 | Gallop | G06F 8/4441 717/116 |
| 8,307,345 B2* | 11/2012 | Sunkara et al. | 717/130 |
| 8,522,222 B2* | 8/2013 | Tillmann | G06F 8/443 717/128 |
| 2002/0052856 A1* | 5/2002 | Satoh | 706/4 |
| 2002/0152455 A1* | 10/2002 | Hundt et al. | 717/131 |
| 2002/0194580 A1* | 12/2002 | Ramasamy | G06F 11/3612 717/130 |
| 2002/0199172 A1* | 12/2002 | Bunnell | 717/128 |
| 2003/0163608 A1* | 8/2003 | Tiwary | G06F 11/3414 710/1 |
| 2003/0212988 A1* | 11/2003 | Tsai et al. | 717/130 |
| 2004/0049579 A1* | 3/2004 | Ims et al. | 709/225 |
| 2004/0163077 A1* | 8/2004 | Dimpsey et al. | 717/130 |
| 2004/0168156 A1* | 8/2004 | Hundt et al. | 717/130 |
| 2004/0199904 A1* | 10/2004 | Schmidt | 717/130 |
| 2004/0243882 A1 | 12/2004 | Zhou | |
| 2004/0268244 A1* | 12/2004 | Levanoni et al. | 715/514 |
| 2004/0268367 A1* | 12/2004 | Roe et al. | 719/318 |
| 2005/0010930 A1* | 1/2005 | Vaught | 719/318 |
| 2005/0102656 A1* | 5/2005 | Viehland et al. | 717/130 |
| 2005/0114848 A1* | 5/2005 | Choi et al. | 717/148 |
| 2005/0216885 A1* | 9/2005 | Ireland | 717/108 |
| 2006/0015854 A1* | 1/2006 | Muhlestein et al. | 717/130 |
| 2006/0080394 A1* | 4/2006 | Goodman et al. | 709/206 |
| 2006/0095895 A1* | 5/2006 | Sudheer | 717/130 |
| 2006/0101438 A1* | 5/2006 | Mariani | 717/148 |
| 2006/0112037 A1* | 5/2006 | Chagoly et al. | 706/20 |
| 2007/0006184 A1 | 1/2007 | Andrews et al. | |
| 2007/0074175 A1 | 3/2007 | Bengtsson et al. | |
| 2007/0214461 A1 | 9/2007 | Glatron et al. | |
| 2007/0220495 A1* | 9/2007 | Chen et al. | 717/130 |
| 2008/0004886 A1 | 1/2008 | Hames et al. | |
| 2008/0270988 A1* | 10/2008 | Li et al. | 717/125 |
| 2009/0083271 A1* | 3/2009 | Day et al. | 707/9 |
| 2009/0172651 A1 | 7/2009 | Need et al. | |
| 2009/0228904 A1* | 9/2009 | Meijer | G06F 8/30 719/320 |
| 2009/0293045 A1* | 11/2009 | Cheriton | 717/136 |
| 2010/0058338 A1* | 3/2010 | Schneider | 718/1 |
| 2010/0313184 A1* | 12/2010 | Gustafsson | G06F 9/45516 717/116 |
| 2016/0321045 A1* | 11/2016 | Radigan | G06F 8/443 |

OTHER PUBLICATIONS

Shi et al., An intermediate language level optimization framework for dynamic binary translation, Apr. 2007, 7 pages.*

Drape et al., Transforming the .NET intermediate language using path logic programming, Oct. 2002, 12 pages.*

Stepanian et al., Inlining java native calls at runtime, Jun. 2005, 11 pages.*

Carroll et al., A framework for incremental extensible compiler construction, Jun. 2003, 10 pages.*

Shinjo et al., Efficient mediators through dynamic code generation: a method and an experiment, Mar. 2003, 8 pages.*

Feijao Antonio, "InjLib—A Library that Implements Remote Code Injection for All Windows Versions", Retrieved at<<http://69.10.233.10/KB/library/InjLib.aspx?display=Print>>, Oct. 14, 2008, pp. 1-11.

Golm, et al. "MetaJava—A Platform for Adaptable Operating-System Mechanisms", Retrieved at<<http://www4.informatik.uni-erlangen.de/TR/pdf/TR-I4-97-10.pdf>>, Presented at the ECOOP 97 Workshop Jun. 10, 1997, Jyväskylä, Finland, pp. 1-10.

Wien, et al. "Middleware Support for Adaptive Dependability through Explicit Runtime Integrity Constraints" Retrieved at<<http://www.inf.unisi.ch/faculty/jazayeri/docs/Thesis_Lorenz_Froihofer.pdf>>, Sep. 2007, pp. 124.

Couvreur Julien, "IL Modification at Runtime (Step III)", Retrieved at<<http://blog.monstuff.com/archives/000077.html>>, Oct. 14, 2008, pp. 1-8.

Gaisbauer Markus, "Cross-platform IL Code Manipulation Library for Runtime Instrumentation of .NET Applications", Jul. 5, 2007, pp. 1-5.

* cited by examiner

IN-PLACE FUNCTION MODIFICATION

BACKGROUND

In a computing environment, a language neutral computing framework can be created by a software technology that manages execution of programs developed within the framework. Within this type of framework, high-level computer code can be compiled to an intermediate language, such as an object-oriented assembly language, which is common to the framework regardless from which high-level programming language it was compiled. This type of environment is often called a common language infrastructure, which can provide a language-neutral platform for application development and execution. The language-neutral platform can support a runtime environment for executing programs developed within the framework that can provide a sort of application virtual machine for running applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

When a computer program debugger or tester wishes to diagnose performance of functions in the program they can modify code in the program code. Modifying code can be used, among other things, to test faults, change an operation in the program, or perform code coverage testing. Typically, modifying code can be injected into an existing program before compiling the computer code to a machine level language, and code coverage of the programs functions can be determined at runtime, for example. However, code modification may also cause some unintentional side affects to the operation of the program, such as creating additional calls and adding parameters that add to the overhead of running a program. Further, adding or modifying code may alter code stacks for the program, changing stepping and breakpoints.

Modifying code can also be performed at or immediately prior to runtime of the computer code. Several variations currently exist where modifying code can be injected during compilation from a high-level language to either an intermediate language or machine language. Further, where a "just-in-time" (JIT) compilation service is utilized (e.g., where intermediate code is compiled to machine code during program runtime), modifying code can be injected to change functions chosen by a user immediately prior during the JIT service operation. However, current techniques for runtime code modification typically utilize modules of intermediate language code that have been pre-defined for a specified platform; or the modifications are created by a user in intermediate language "on-the-fly," when a desired function is identified in the program. Further, current techniques for runtime code modification may also require creating modules in native code for the execution platform.

Techniques and systems are provided herein for accessing and modifying functions of a program at runtime, by injecting arbitrary code from a separate file, while mitigating altering a call stack of the code by running the injected code in a same stack frame as original code. In one embodiment, one can modify a function in a computer code, which is being executed by a computer system, while mitigating a change to functionality of the computer code. Although some of the discussion herein relates to diagnostic applications, it will be appreciated that other applications are contemplated, and that diagnostics is merely one example.

In this embodiment, a just-in-time (JIT) compilation service can be used, which can convert intermediate language (IL) code at runtime prior to executing it natively. The JIT service can be used in a runtime environment of a common language infrastructure for executing a computer program that was compiled to the IL. Further, in this embodiment, an event-based profiling agent (profiler) can be attached to the runtime environment of the common language infrastructure and used to detect and modify, for example, user selected functions in the IL of the computer code prior to compilation to machine code.

In this embodiment, detecting the selected functions being compiled by the JIT service, for example, can be performed by comparing function callbacks from the profiler to user defined configuration data that identifies the functions. In this example, the configuration data can be located in a file separate from the computer program being executed. Further, modifying the detected function can be performed by injecting modifying IL code from, for example, user generated stub methods located in a stub assembly. In this example, the stub assembly may be located in a file separate from the computer program. Additionally, the modifying code may comprise prologue code injected prior to the desired function code, and/or epilogue code injected after the desired function code.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 1:
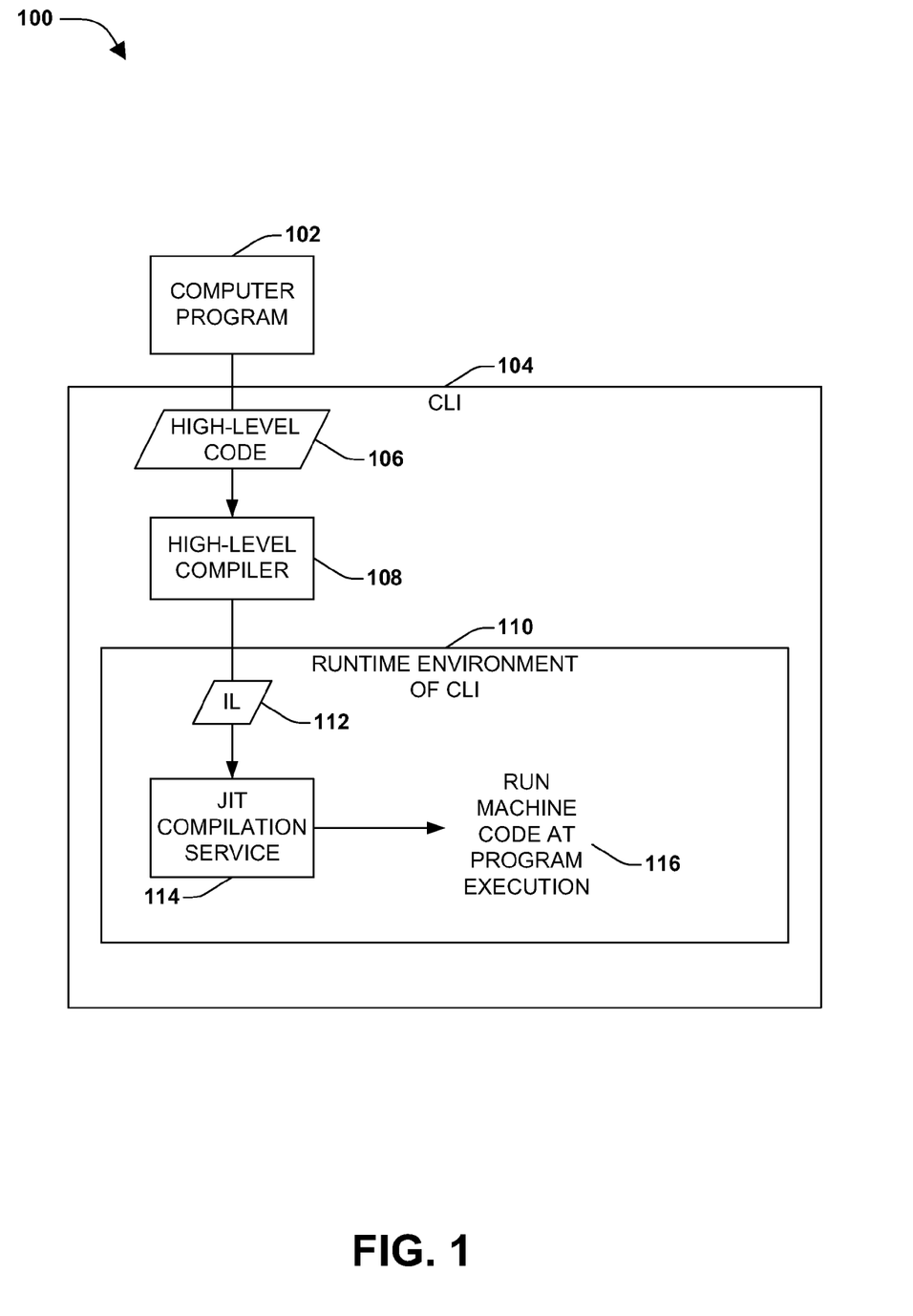
FIG. 1 is an illustration of an exemplary embodiment of an environment where a computer program may be compiled at runtime.

FIG. 1 is an illustration of an example computing environment 100 where a computer program 102 can be compiled to machine executable code (e.g., native code) at runtime (e.g., while the program is being executed on a computer system). In the example computing environment 100 the computer program 102 can be written in a high-level computer programming language, such as $C^\#$ and Visual Basic, within the framework of the computing environment 100. A common language infrastructure 104 (CLI) can be utilized as a language-neutral platform for development and execution of an application that comprises the computer program 102 describes. For example, a CLI may be used to develop and execute respective applications written in various high-level computer programming languages.

In this example computing environment 100, the CLI 104 comprises a high-level language compiler 108 which can be used to compile high-level language code 106 to intermediate language (IL) code 112 that is common for the CLI 104. For example, any high-level language used within the computing framework can be assembled into a common bytecode that can be executed within the CLI 104, regardless of which high-level language the IL was compiled from.

In the example computing environment 100, the IL code 112 can be sent to a runtime environment of the CLI 110, which can execute the IL code 112. The runtime environment 110 can act as a type of virtual machine within the CLI 104 to compile the IL code 112 to native code for the operating system running on a computer system, for example, and execute the code to run the application. The runtime environment can comprise a just-in-time (JIT) compilation service 114 (e.g., also known as a dynamic translator) that is designed to convert IL code 112 to native machine code at runtime of a program. Essentially, for example, when the program is initiated within the runtime environment its code is compiled to machine code and the machine code is executed by the JIT service while the program is running 116. This type of JIT compilation typically allows for an improved runtime performance of a computer program.

One embodiment of the computing environment described above is Microsoft® ".NET" framework. ".NET" utilizes a CLI that comprises one or more high-level language compilers for compiling computer programs written in a high-level language to the CLI's common intermediate language (CIL). The ".NET" CLI also comprise a Common Language Runtime (CLR) which is the virtual machine component of the ".NET" framework for executing the computer program. In this embodiment, the CLR utilizes a JIT compilation service for compiling the CIL to native code and executing the native code at runtime of the computer program.

In another embodiment, Sun Microsystem® Java® framework utilizes a similar environment whereby high-level programming is compiled to a Java® specific intermediate language. In this embodiment, a Java® Runtime Environment (JRE) comprises a Java® Virtual Machine (JVM) that can compile and execute the intermediate language at runtime of a computer program.

In one aspect, a user may wish to modify a function in a computer program, for example, at runtime of the program within a common language infrastructure (CLI), without changing key operations of the program. In one embodiment, an event-based profiling agent (profiler) can be attached (e.g., as a COM server) to the runtime environment of the CLI. In this embodiment, the runtime can then provide method callbacks into the profiler, which can trap events such as functions going through JIT compilation.

As an example, a language-neutral platform, such as a CLI, typically provides a large library of pre-coded solutions to common programming issues. In this example, a computer program may include code that calls to a function in the software library of the CLI, and when executed, that function can be called back from the library to the program. In this way, by retrieving callbacks of functions that are proceeding through the JIT compilation from intermediate language (IL) code to native code, one may be able to identify functions that they wish to modify prior to execution.

Figure 2:
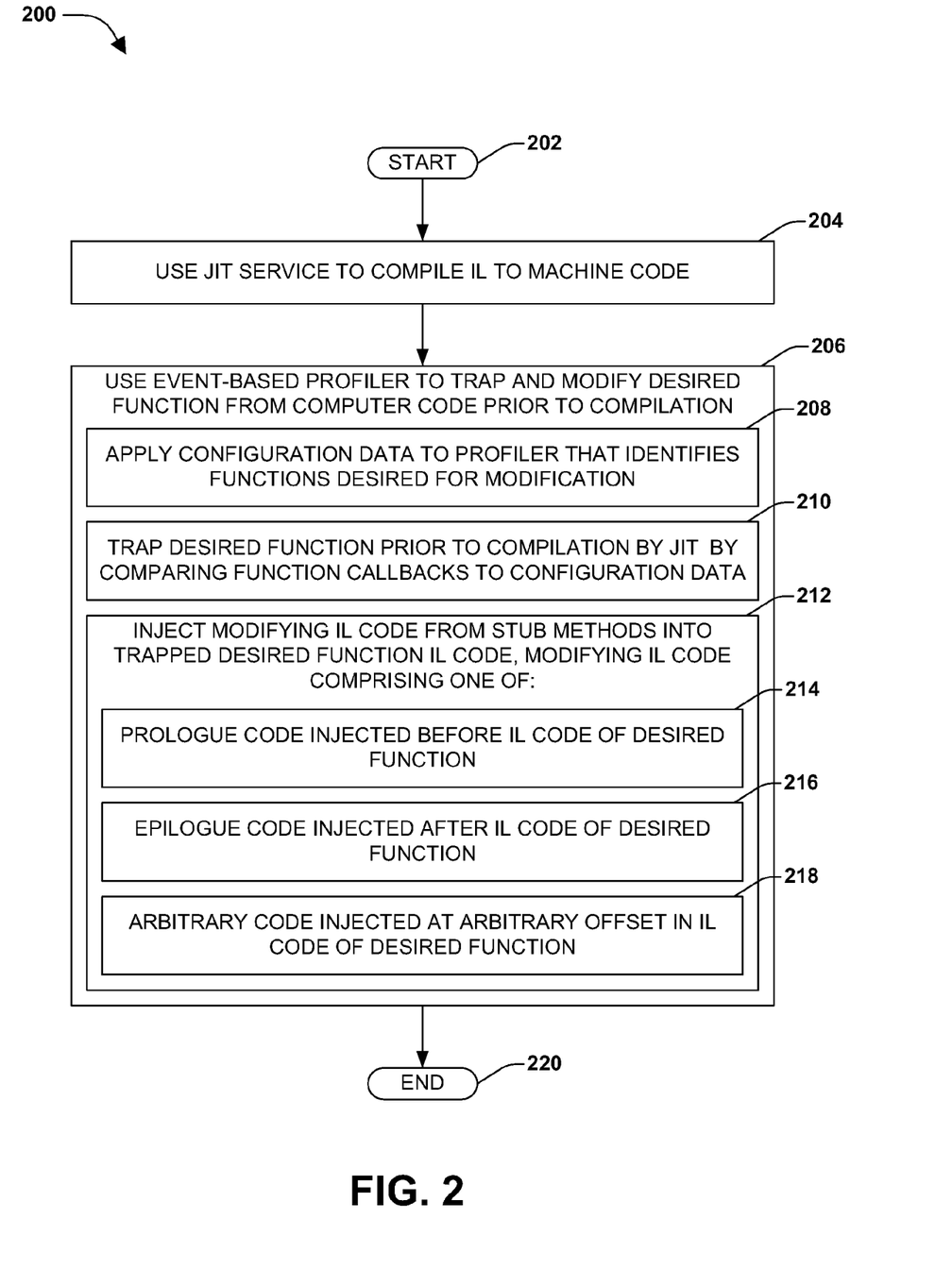
FIG. 2 is a flow chart diagram illustrating an exemplary method for modifying a function in a computer code, which is being executed by a computer system, while mitigating a change to functionality of the computer code.

FIG. 2 is a flow chart of an exemplary method 200 for modifying a function in a computer code, which is being executed by a computer system, while mitigating a change to functionality of the computer code. The exemplary method 200 begins at 202 and involves using a just-in-time (JIT) compilation service in a runtime environment of a common language infrastructure (CLI) to compile intermediate language (IL) code, stored in memory of the computer system, into machine language code that will be executed on the computer system, at 204. For example, as described above, a user can initiate a computer program in the runtime environment of the CLI, which uses the JIT to compile and execute the IL code during the running of the program (e.g., as functions from the IL code are called for a first time, JIT compiles them for execution).

At 206, an event-based profiling agent (profiler) can be used in the runtime environment (e.g., attached to the runtime environment) of the CLI to trap and modify a desired function in the IL of the computer code prior to compilation to machine code. For example, during runtime of the computer program the profiler can be used to identify a function that a user wishes to modify, trap the function, and then modify the function prior to it being compiled and executed by the computer system.

At 208, in order to identify the desired function to be trapped prior to compiled by the JIT, configuration data from a configuration file can be applied to the event-based profiling agent, which identifies one or more functions desired for modification in the IL of the computer code. As an example, a user may wish to modify one or more desired functions in a computer program prior to JIT compilation. In this example, the user can create a configuration file that comprises profiler configuration data identifying the desired functions. Further, in this example, while the profiler may operate independently from a user created configuration file, the configuration data can be used by the profiler to identify merely those functions desired to be trapped and modified by the user.

At 210, a desired function that is to be compiled by the JIT service can be trapped by the event-based profiling agent by comparing callbacks of functions from the runtime environment of the CLI with event-based profiling agent configuration data. As an example, code in the program being executed in the runtime environment may call to functions in the CLI software library, as described above. In this example, the runtime environment can provide the callbacks of the functions to the profiler, which can compare them with the configuration data provided from a user created configuration file. In this way, in this example, the profiler can trap merely those functions that are identified by the configuration data.

At 212 in the exemplary method 200, modifying intermediate language code from one or more stub methods, from a stub assembly file, can be injected into the trapped desired function's intermediate language code prior to machine code compilation of the desired function. For example, a user may be utilizing a language-neutral computing platform, such as the ".NET" CLI, to develop a computer program in a particular high-level language (e.g., C#). In this example, the user can also write a set of stub methods as a separate stub assembly file in a high-level language that compiles to the IL (e.g., could be a same or different language than that of a base computer program). The CLI can compile the computer program and the stub assembly file to an IL (e.g., ".NET" CIL). Further, in this example, the sub method code, now in IL, can be injected into the computer program's code at the desired function, which is also in IL.

The stub method code injected can comprise at least one of: prologue code injected directly preceding the desired function, at 214; epilogue code injected directly after the desired function, at 216, and arbitrary code injected at an arbitrary offset inside the desired function, at 218. For example, the user may create a stub module that comprises a cutline that calls to the desired function, with prologue code prior to the cutline and/or epilogue code after the cutline. In this way, in this example, if present, the prologue code can be injected (e.g., merged) into the code for the desired function in the stub method, and the epilogue code can be injected after the code for the desired function. Additionally, in another example, code may be inserted within a body of the desired function to intercept a return value (e.g., and/or change the return value) after a call to the library function. A user may wish to use epilogue code, for example, to determine what happens when the desired function code is run unaltered then the epilogue code is run. Further, the user may wish to determine what happens when the desired function is altered by the prologue code, or a combination of both.

In one embodiment, for example, a user may wish to inject prologue and/or arbitrary code to inspect a desired function's argument, and/or to alter the arguments in a desired manner. Further, in this example, prologue code may be use to report out (e.g., to a database designed by the user) when the desired function has been executed, and mark a time of execution. Additionally, in another embodiment, epilogue code can be used to inspect return values from the desired function, report other code execution, and a variety of other purposes. It will be appreciated that a desired function modification code (e.g., prologue, epilogue, and arbitrary code) can be used for a variety of function inspection, alteration and inspection purposes, and the techniques and systems, described herein, are not limited to the embodiments described above. Those skilled in the art may devise alternate modification code purposes.

Having modified the desired function with selected stub method code, the exemplary method 200 ends at 220.

Figure 3:
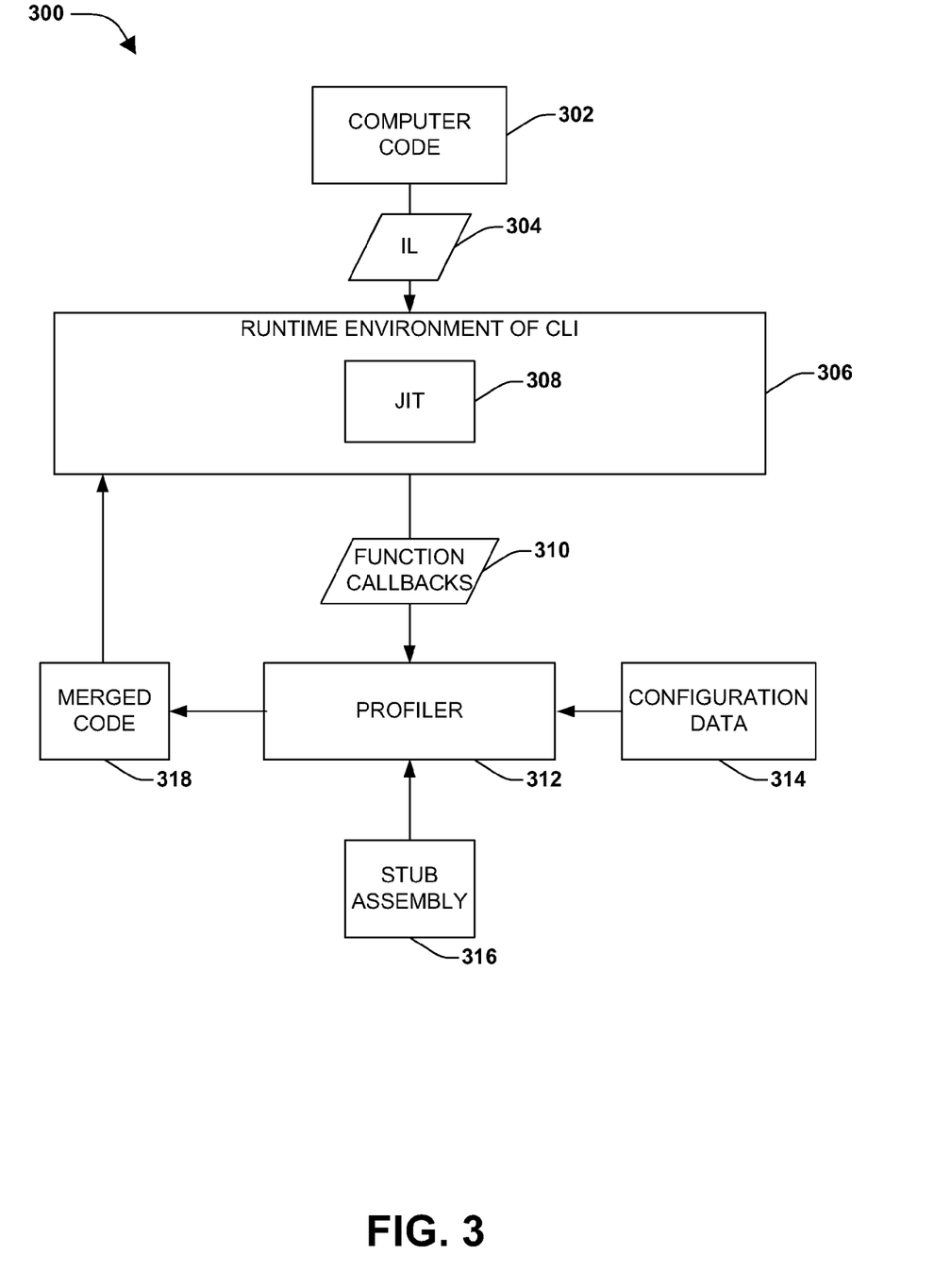
FIG. 3 is an illustration of an exemplary embodiment of an environment where techniques described herein may be employed.

FIG. 3 is an illustration of an exemplary embodiment of a computing environment 300 where the exemplary method 200 may be employed. A user may write (e.g., or load) a computer program 302 in a high-level language (e.g., visual basic, C#, Python) in a language-neutral application development and execution framework (e.g., ".NET," Java®). As described above, a common language infrastructure (CLI) of the framework may comprise an intermediate language (IL) compiler that can compile the high-level language computer code 302 to the CLI's IL code 304 (e.g., Common Intermediate Language (CIL) in ".NET").

In order to execute the computer program code 302 the IL 304 is sent into the runtime environment of the CLI 306, which comprises a "just-in-time" compilation service 308 (JIT). As described above, the JIT 308 compiles the IL code 304 to machine code (native code) at runtime of the program. However, in this exemplary environment 300, when the computer program calls to predefined functions (e.g., or any function about to be compiled from IL to machine code) in the library of the runtime environment 306, the function callbacks 310 are sent to a profiler 312 that is attached to the runtime environment 306, instead of immediately back to the JIT 308. Further, the profiler 312 has been updated with configuration data 314 (e.g., from a separate file created by the user) that comprises information to identify those functions called by the program that a user may be interested in modifying.

In this example, the profiler can compare the function callbacks sent from the runtime environment 306 with the configuration data 314 to identify a user desired function. Once a desired function has been identified, the profiler 312 can trap the function callback 310 and retrieve a corresponding stub method from a stub assembly file 316 (e.g., that has been created by the user, and compiled from a high-level language to the IL). In one embodiment, a user (e.g., a third-party user or framework provider) may create a stub module that can be injected into one or more of the desired functions. In another embodiment, the user may create stub modules for respective desired functions.

The profiler 312 can then merge the stub module code from the stub assembly 316 with the trapped, desired function callback 310 to create merged code 318. In this embodiment, the merged code comprises the original function from the runtime environment library, and prologue and/or epilogue code. The merged code 318 is then sent back to the runtime environment 306 by the profiler, to be compiled and executed by the JIT 308. Further, function callbacks 310 that are not desired by the user to be modified would be released back to the JIT 308 without modification (e.g., not trapped by the profiler 312). In this way, in this embodiment, the profiler can modify the computer code 302 at runtime, for example. By injecting the modification code in place, in this example, the modified code can be run in a same stack frame as the original code without altering the program's call stack.

Figure 4:
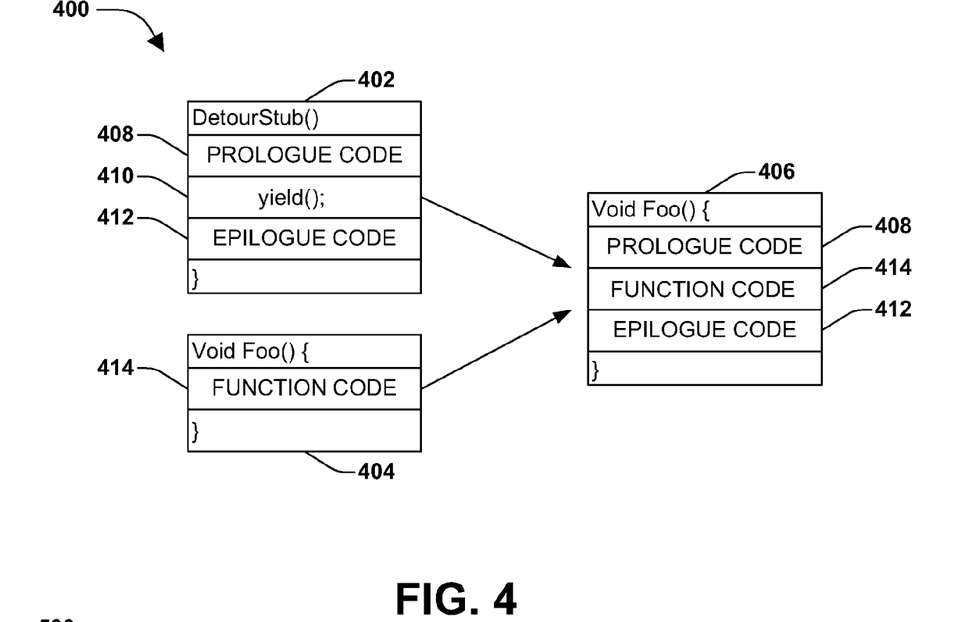
FIG. 4 is an illustration of an exemplary computer code structures employing techniques described herein.

FIG. 4 is an illustration of exemplary computer code structures 400 employing the code merging techniques described above. A function 404 (Void foo) that is called back from a runtime environment's solution library comprises function code 414 in a framework's intermediate language (IL). A stub assembly file can be created by a user that comprises one or more stub methods 402 (DetourStub) that comprise epilogue code 408, a cutline 410, and epilogue code 412. In this example 400, when a profiler merges the function code and stub method code, the prologue code 408 is inserted before the function code 414, and the epilogue code 412 is inserted after the function code 414. The cutline

410 (yield) is a place holder in the stub assembly 402 that identifies a location for the desired function code 414. In this way, the merged code 406 can be sent back to a JIT in the runtime environment, where the stub assembly code and function code can be compiled and executed.

In one aspect, functions that a user desires to modify prior to JIT compilation, for example, may comprise branches and/or exception handling blocks. Further, the modifying stub methods may also comprise branches and/or exception handling blocks. In this aspect, the modified function code should include respective branches and/or exception handling blocks, if present, along with any instructions to which they may point. In one embodiment, in order to identify potential branches and/or exception handling blocks in the code for the desired function and stub method, the respective code can be represented as a directed graph.

In this embodiment, for example, intermediate language (IL) code for both the function to be modified and the modifying stub method can be parsed by the event-based profiling agent (profiler) attached to the runtime environment of the common language infrastructure (CLI). Further, in this example, once parsed a directed graph of the code can be represented internally by the profiler. In this way, instructions to which the branches and/or exception handling blocks, if present, point to can be identified, and moved into a rewritten modified function along with the branches and/or exception handling blocks, for example. In this embodiment, allowing for this type of code parsing and identification of appropriate code can facilitate easier and more efficient code rewriting for directing a change of a binary IL stream (e.g., JIT compilation and execution of modified functions).

In another aspect, a high-level language compiler in a CLI of a language-neutral framework typically generates metadata that refers to particular data structures that may be embedded in the code of the intermediate language (IL) when it is compiled from a high-level language. In this aspect, this metadata can describe a method, classes, and class members (e.g., the high-level structure of the code) defined in the assembly of the IL, along with those called from other assemblies within the CLI. The metadata generated by the high-level language compiler is typically stored in an assembly that comprises the IL for a compiled program. When the JIT executes the IL, the runtime environment can utilize a metadata inspection application programming interface (API) to check metadata tokens/signatures of a called method to determine whether they match the metadata stored in the IL of the method that is doing the calling.

In this aspect, in one embodiment, when code from a modifying stub method is injected (e.g., merged with) into code from a function that is desired to be modified, the profiler can utilize the metadata inspection API to resolve information from assembly metadata tokens (e.g., signatures) from the stub method code in order to create appropriate IL code for the merged modified function. In this embodiment, for example, resolving appropriate information for the metadata tokens from the stub method code can result in IL code for the modified function that is semantically equivalent to the desired function, thereby enabling a called modified (e.g., including the stub method code) method to execute as described above.

Further, in one embodiment, a profiler used to modify a desired function can utilize a metadata token emission API, which is compatible with that portion of the framework's high-level language compiler, to generate metadata tokens at compilation, for example. In this way, in this example, after the appropriate metadata token information is resolved for the stub method code, compatible and appropriate metadata tokens can be created for the modified functions and copied to the merged code, which can allow the modified code to execute at runtime.

Figure 5:
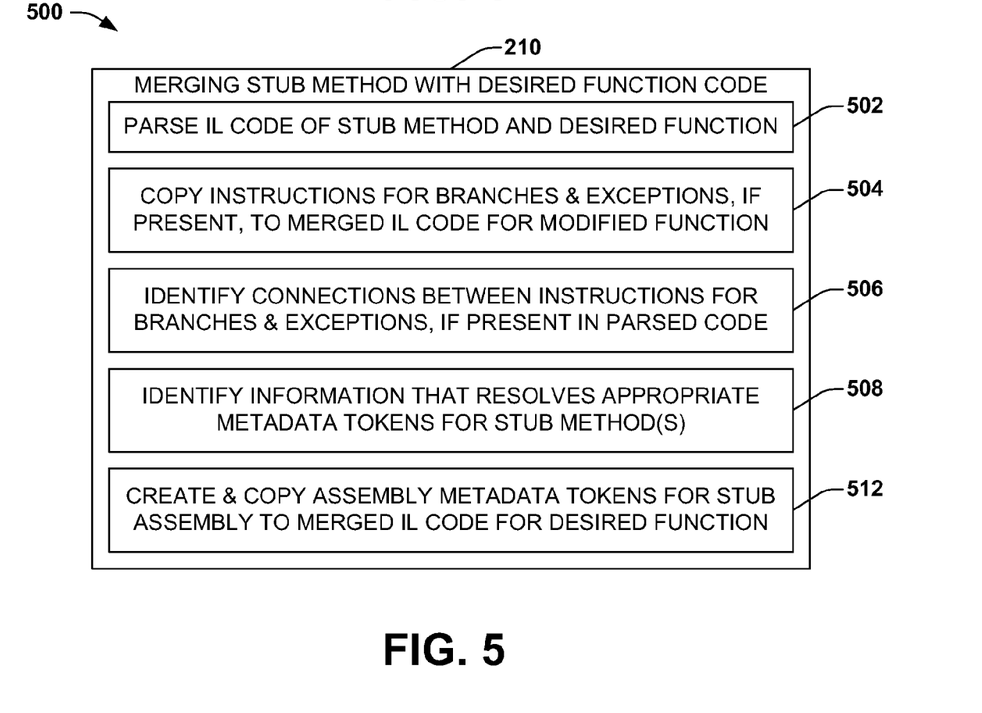
FIG. 5 is a block diagram illustrating an exemplary embodiment of a portion of the techniques described herein.

FIG. 5 is a block diagram illustrating one embodiment 500 of a portion of a method for modifying a function in a computer code, which is being executed by a computer system, while mitigating a change to functionality of the computer code. At 210 (e.g., as described in FIG. 2, 200), a desired function that has been targeted for modification is merged with a stub method. For example, a user identifies certain functions that they wish to modify in configuration data used to configure an event-based profiling agent (profiler) attached to a runtime environment of a common language infrastructure (CLI), and the user creates a stub assembly of stub methods for modifying the desired functions.

At 502, intermediate language (IL) code for both the desired function and modifying stub method are parsed. For example, the IL code can be broken down into respective elements and represented internally (e.g., within the profiler) as a directed graph, which may allow the profiler to identify branches and/or exception handling blocks in the code. At 504, if branches and/or exception handling blocks are present in the IL code, instructions to which they point can be copied by the profiler to the modified code. For example, when branches are executed and/or exceptions are thrown, they typically lead to a set of code instructions that may lead away from a main body of the code. In this example, one may wish to copy into the merged code.

At 506, if instructions have been copied for branches and/or exception handling blocks that may be present, connections between the instructions can be identified in order to preserve branch and exception handling structure in the code for the modified function (e.g., along with respective instruction for the stub method). At 508, information that resolves framework appropriate metadata tokens (e.g., signatures) for the stub method code is identified using a metadata inspection API. For example, the created metadata tokens should be able to match tokens from a method calling to the stub method code. At 512, appropriate assembly metadata tokens for the stub method code are created by a metadata token emission API, based on the information from the metadata inspection API, and copied to the rewritten merged code for the modified function.

Figure 6:
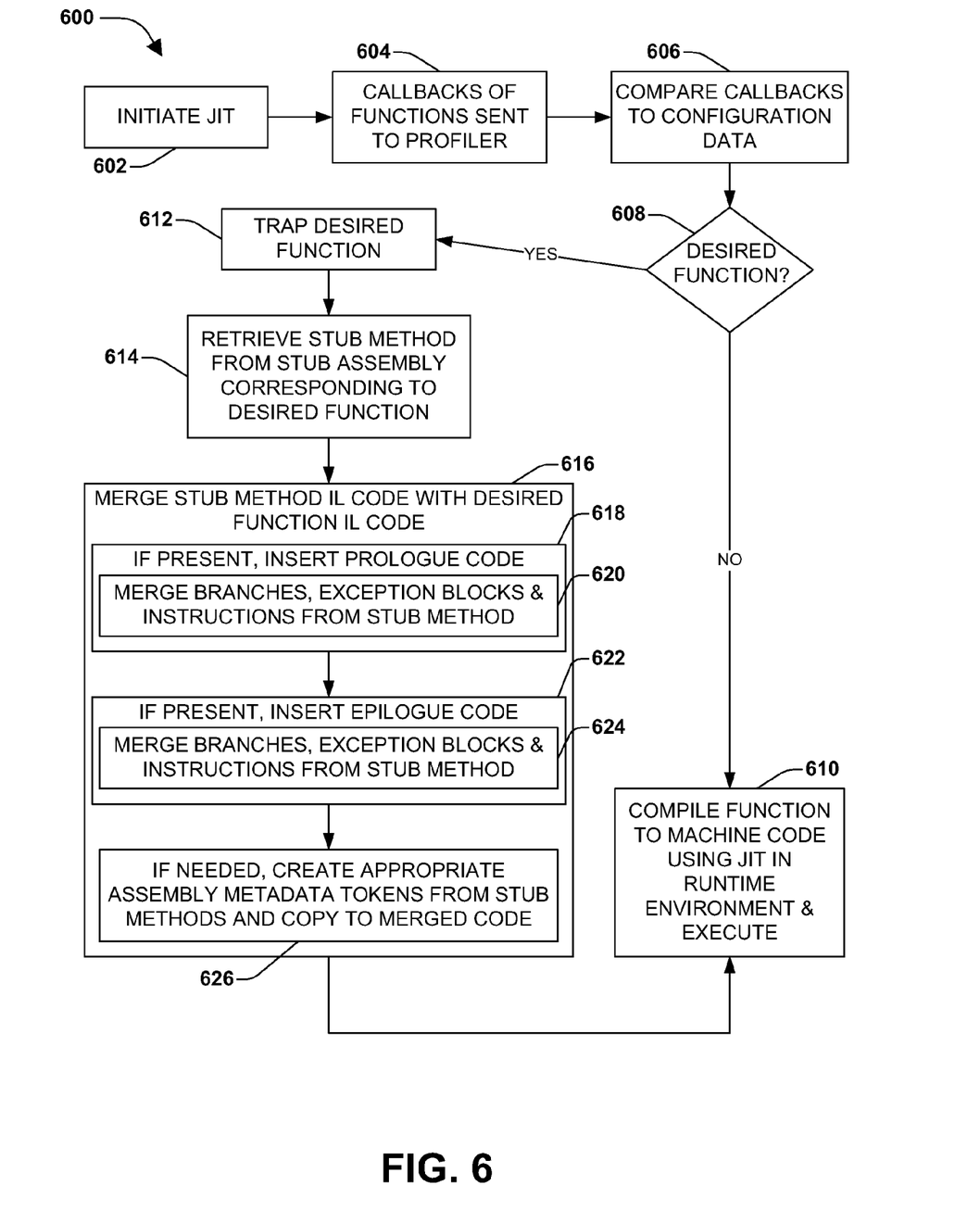
FIG. 6 is a flow chart diagram illustrating an exemplary embodiment of techniques described herein.

FIG. 6 is a flow chart diagram illustrating one embodiment 600 of an implementation of the techniques described herein. At 602, a just-in-time compilation service (JIT) is initiated in a runtime environment of a common language infrastructure (CLI). For example, a program written in visual basic in a ".NET" framework may have been compiled to common intermediate language (CIL) in the CLI of ".NET", and sent to common language runtime (CLR) where the JIT begins to compile CIL to machine language and execute the program.

At 604, callbacks of functions that are called by the code being executed by the JIT are sent to a profiler attached to the runtime environment. For example, the CLR of ".NET" comprises a library of pre-coded functions that can be called by a program being executed by the JIT. When the program calls to one of these functions in the library, for example, the CLR can send the function callback to the attached profiler. At 606, the function callback can be compared to configuration data that was used to configure the profiler, which identifies those functions that are desired to be modified prior to execution. In one example, the configuration data can be loaded to the profiler from a separate configuration file created by a third-party (e.g., user).

If the called function is not a desired function, at 608, it is sent back to the JIT where the function is compiled to machine code and executed at runtime, at 610. If the called function is a function that has been targeted for modification, at 608, it is trapped by the profiler for modification, at 612. A stub method that corresponds to the trapped function is retrieved from a stub assembly, at 612. In one embodiment, a user can create a stub assembly file that can comprise one or more stub methods used to modify a corresponding target function. In this embodiment, the profiler can retrieve the stub method from the assembly that the user has designated for the trapped function. In another embodiment, the assembly may comprise one stub method that can be used for respective trapped functions.

At 616, the IL code from the stub method and trapped function are merged to create modified function IL code. Merging the stub method and desired function comprises inserting prologue code, if present in the stub method, prior to the desired function, at 618; which may further comprise merging branches and/or exception handling blocks and the instructions to which they point, if present in the prologue code, at 620. Further, merging the stub method and desired function comprises inserting epilogue code, if present in the stub method, after the desired function, at 622, which may further comprise merging branches and/or exception handling blocks and the instructions to which they point, if present in the epilogue code, at 624. Additionally, at 626, appropriate assembly metadata tokens information is resolved for the stub method code, and appropriate IL code is created for the merged function and copied to the modified code for the desired function.

In this embodiment 600, after modifying stub method code has been injected into a targeted desired function's code, including appropriate instructions and metadata tokens, the modified code can be sent back to the JIT in the runtime environment, where is can be compiled to machine code and executed, at 610. In this way, in this embodiment, a desired function's code can be modified and the modified code can run in a same stack frame as the original function's code. Thereby allowing a user, for example, to create separate function modification files (e.g., stub assemblies and configuration files) that can be used to modify a program without having to create IL code specific to respective target functions.

Figure 7:
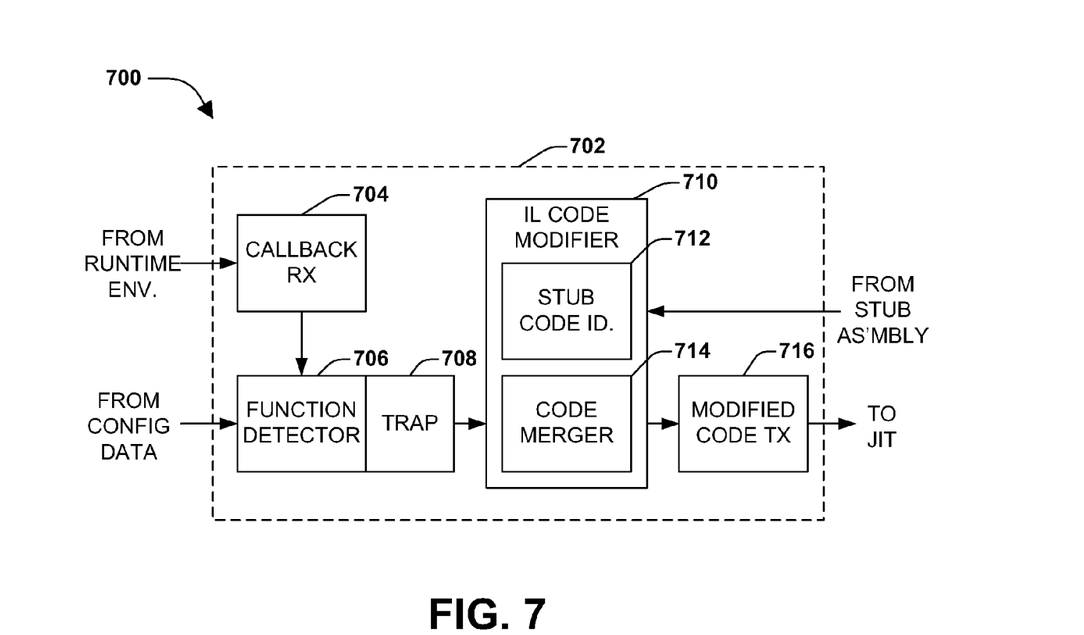
FIG. 7 is a block diagram illustrating one exemplary embodiment of application programming interface (API) that may be used for modifying a desired function in computer code without altering a call stack of computer code, by running injected modifying code arguments in a same stack frame as the desired function.

An application programming interface (API) can be devised that utilizes function modifying code compiled from a high-level programming language, for example, from a user created stub assembly file of stub methods, to modify a computer program functions compiled during runtime by a just-in-time compilation service (JIT). FIG. 7 is a block diagram of an embodiment 700 of an exemplary API 702, which when executed by a computer system, modifies a desired function from a computer program being executed by a JIT. In one embodiment, the API can be an even-based profiling agent attached to a runtime environment of a common language infrastructure of a language-neutral computer program development and execution framework (e.g., a ".NET" profiler API attached to the common language runtime (CLR) of ".NET" framework's common language infrastructure (CLI)).

In the exemplary embodiment 700, the API 702 comprises a callback receiving component 704, which can be configured to receive function callbacks from a runtime environment of a common language infrastructure. In one embodiment, a computer program can call to a function that is located in a library of the common language infrastructure (e.g., the program does not include the called function's code but has code that calls out to the CLI's library, in order to utilize the called function during the program's execution). In this embodiment, the runtime environment can detect the call and, instead of sending the function as a callback to the JIT for compilation and execution, send it to the callback receiving component 704 of the API 702.

The API 702 further comprises a desired function detection component 706, which can be configured to detect a desired function from amongst the function callbacks, the desired function comprising a function designated by API configuration data from an API configuration file. For example, a user can create a configuration file that configures the API 702 to select functions that the user wishes to modify. In this example, the desired function detection component 706 can compare function callbacks received by the callback receiving component 704 with configuration data to detect a user desired function.

In the exemplary embodiment, the API 702 further comprises a desired function trapping component 708, which can be operably coupled to the desired function detector 706, and configured to trap desired functions for subsequent code modification. As an example, if a desired function is detected by the desired function detector 706 the desired function trapping component 708 can trap the desired function (e.g., prevent it from being sent back to the JIT for execution) so that it may be modified. In the API 702, an intermediate language (IL) code modification component 710, can be configured to rewrite IL code of the trapped desired function.

The IL code modification component 710 comprises a stub method code identification component 712, which can be configured to identify stub method code from a stub assembly for merging with the desired function code, where the stub method code is selected from a stub assembly in accordance with configuration data for the desired function. For example, as described above, a user can create configuration data that identifies desired functions and associated stub methods in a stub assembly that comprises code for modifying the desired functions. In this example, the stub method code identification component 712 can find a stub method in the stub assembly that corresponds to the desired trapped function and identify a location in the stub method code where the desired function and stub method code can be merged (e.g., where the stub method code can be injected into the desired function code).

The IL code modification component 710 further comprises a code merging component 714, which can be configured to merge the desired function code with the stub method code at the desired location. In this embodiment 700 of the API 702, the code merging by the code merging component 714 can comprise at least one of: injecting prologue code directly preceding the intermediate language code of the desired function; and injecting epilogue code directly after the intermediate language code of the desired function. For example, the stub method code may include prologue modification code, a cutline identifying where the desired function should be located, and epilogue modification code. In this example, the prologue code can be injected before the desired function code, and the epilogue code can be injected after the desired function code.

The API 702 further comprises a modified code transmitting component 716, which can be configured to pass the modified intermediate language code of the desired function to the runtime environment of the common language infrastructure. For example, after the function that the user desired to modify has been modified with the stub method code, it can be sent to the JIT in the runtime environment to be compiled and executed. In this way, in this example, the modifying code can be executed in a same stack frame as the original function code that was trapped by the API 702; thereby allowing modifying code to be injected that has been compiled from a separate high-level language file created by a user, without modifying a stack call of the original program.

Figure 8:
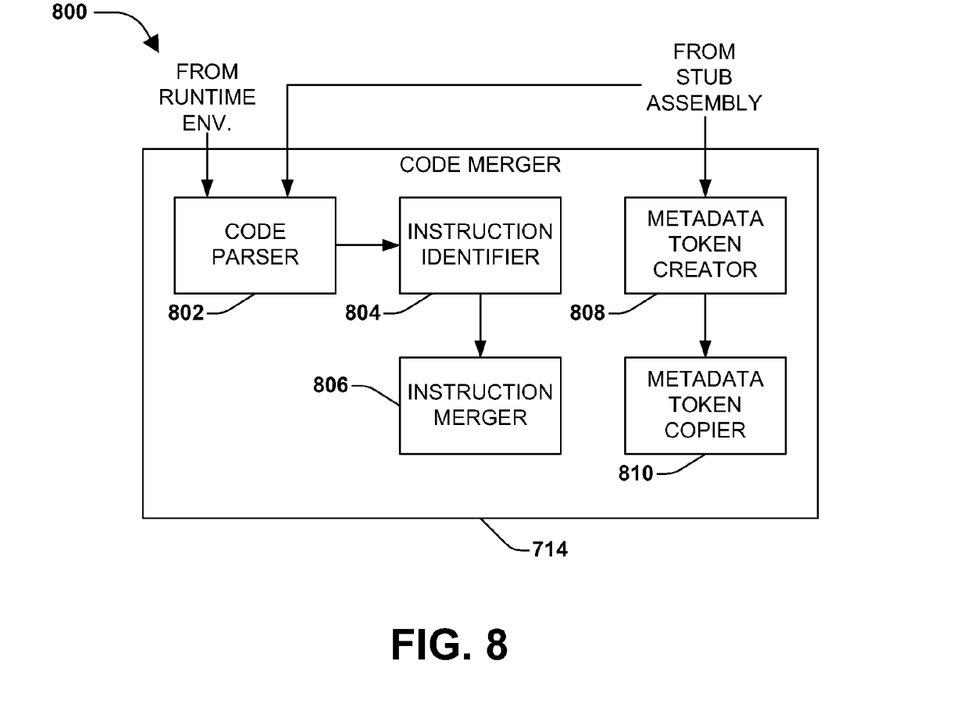
FIG. 8 is an illustration of an exemplary embodiment of a portion of the API described herein.

FIG. 8 is a block diagram of one exemplary embodiment 800 of the code merging component 714. The code merging component 714 can be configured to merge code from a desired function trapped by an API with code from stub assemblies. In this embodiment 800, the code merging component 714 can comprise a code parsing component 802 that can be configured to parse the intermediate language code of the stub method; and be configured to parse the intermediate language code of the desired function. In this way, for example, individual elements, including potential branches and/or exception handling blocks can be identified. In one embodiment, the code parser may represent these elements as a directed graph to facilitate instruction identification.

The code merging component 714 further comprises a code instruction identification component 804, which can be configured to identify instructions to which branches in the parsed code are pointing and instructions to which branches in the parsed code are pointing. For example, if a branch and/or an exception handling block are present in parsed code from the stub methods, the code instruction identification component 804 can identify respective instructions to which they lead. The identified instructions can be passed to an instruction merging component 806, in the code merging component 714, which can be configured to move the identified instructions into the modified intermediate language code for the desired function. In this way, for example, the branches and exception handling blocks can be moved into the merged code along with the instructions they point to, allowing for easier and more efficient code rewriting for the modified function.

In the exemplary embodiment 800, the code merging component 714 further comprises a metadata token creation component 808, which is compatible with the runtime environment of the common language infrastructure, and configured to create appropriate metadata tokens for passing to a metadata inspection API in the runtime environment of the common language infrastructure. For example, the metadata token creation component 808 can create metadata tokens for the stub methods, found in a stub assembly created by a user, that match the metadata tokens in the method calling the desired function.

The code merging component 714 further comprises metadata token copying component 810, which can be configured to copy assembly metadata tokens from the stub method to the modified intermediate language code for the desired function. In this way, for example, resulting modified function code can be semantically equivalent to the stub method code. It will be appreciated that, in some embodiments, one may combine the metadata token creation component 808 and the metadata token copying component 810.

Figure 9:
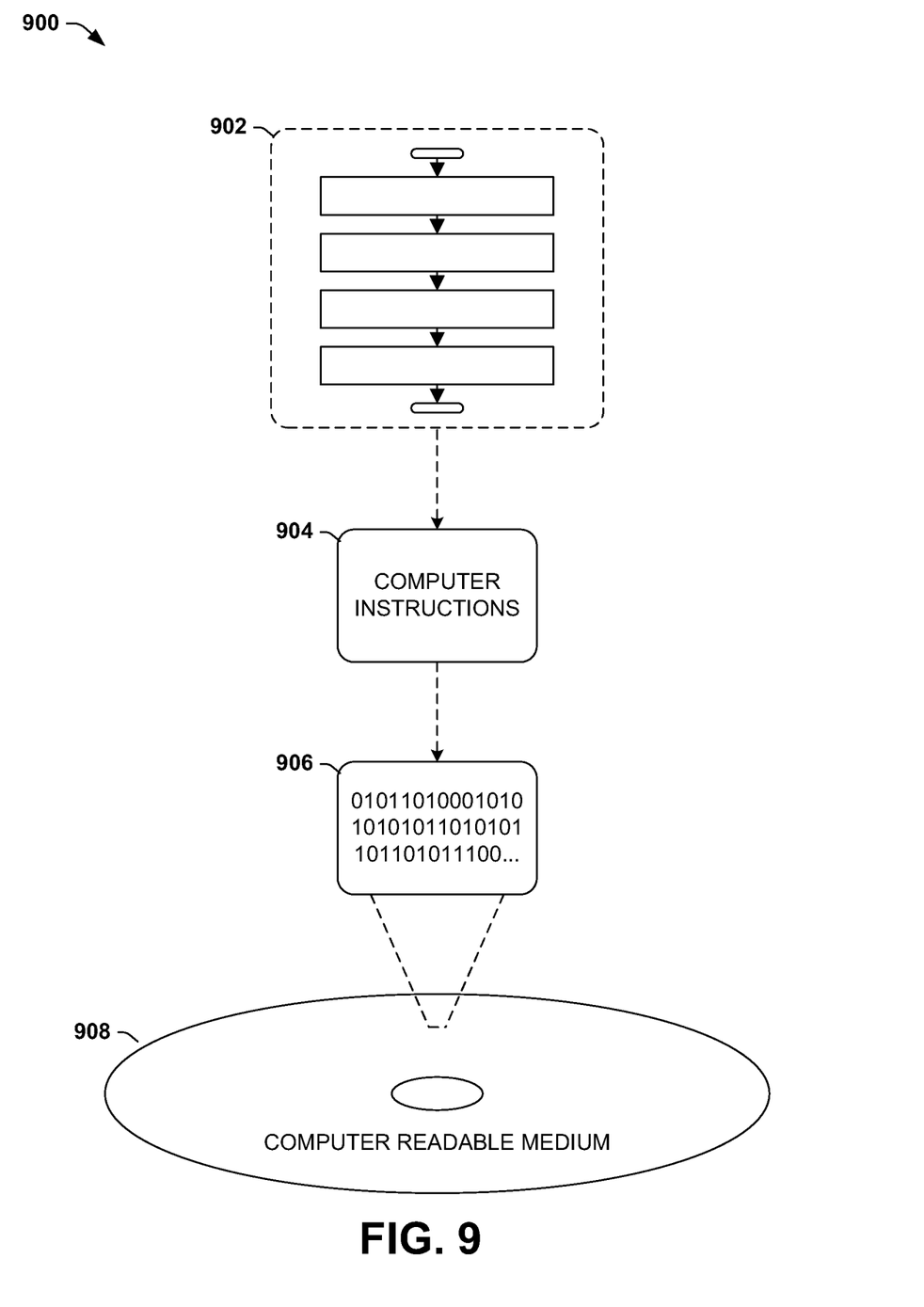
FIG. 9 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 9, wherein the implementation 900 comprises a computer-readable medium 908 (e.g., a CD-R, DVD-R, or a platter of a hard disk drive), on which is encoded computer-readable data 906. This computer-readable data 906 in turn comprises a set of computer instructions 904 configured to operate according to one or more of the principles set forth herein. In one such embodiment 900, the processor-executable instructions 904 may be configured to perform a method 902, such as the exemplary method 200 of FIG. 2, for example. In another such embodiment, the processor-executable instructions 904 may be configured to execute an API, such as the exemplary API 700 of FIG. 7, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
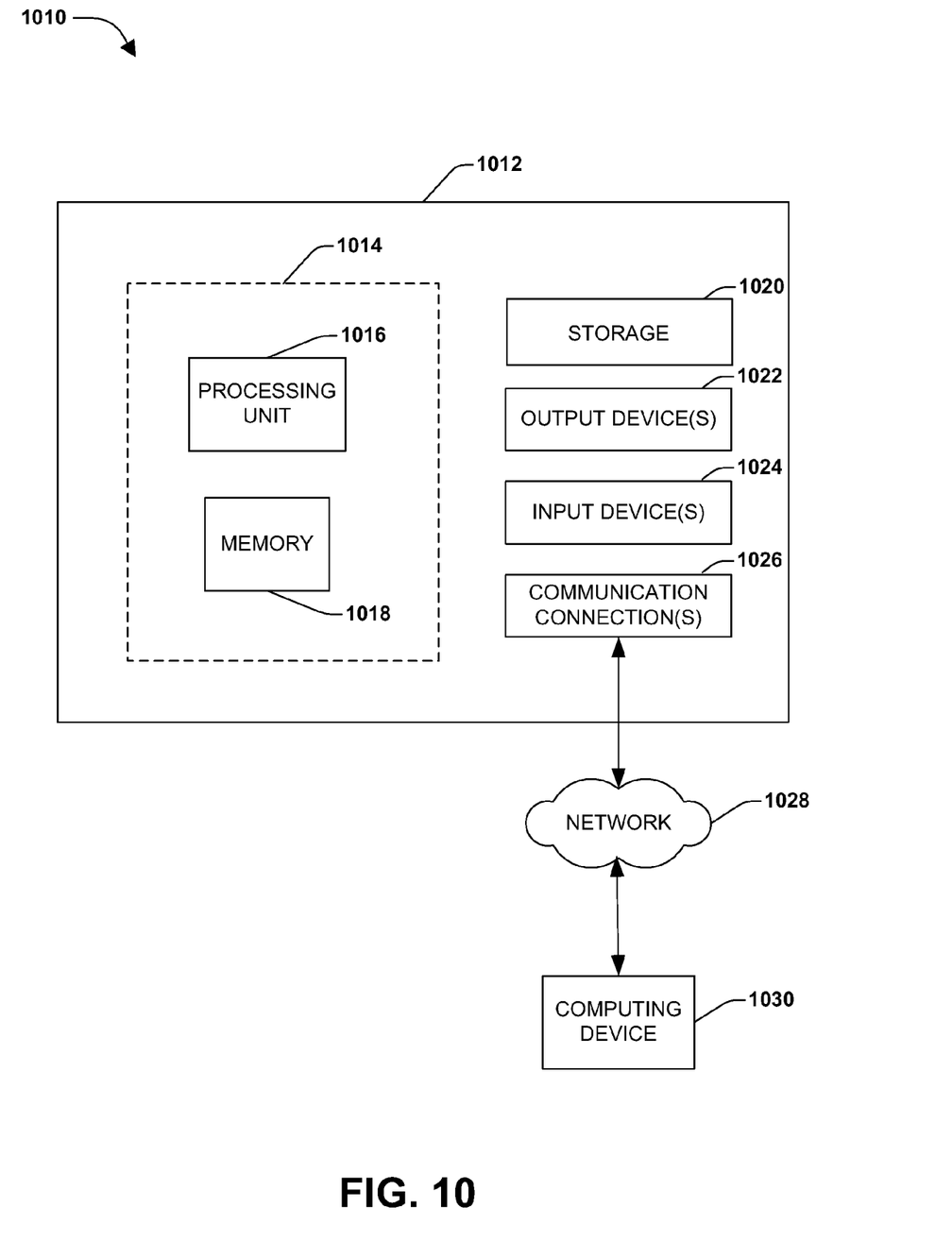
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 1000 comprising a computing device 1012 configured to implement one or more embodiments provided herein. In one configuration, computing device 1012 includes at least one processing unit 1016 and memory 1018. Depending on the exact configuration and type of computing device, memory 1018 may be volatile (such as RAM, for example), non-volatile (such as ROM, flash memory, etc., for example) or some combination of the two. This configuration is illustrated in FIG. 10 by dashed line 1014.

In other embodiments, device 1012 may include additional features and/or functionality. For example, device 1012 may also include additional storage (e.g., removable and/or non-removable) including, but not limited to, magnetic storage, optical storage, and the like. Such additional storage is illustrated in FIG. 10 by storage 1020. In one embodiment, computer readable instructions to implement one or more embodiments provided herein may be in storage 1020. Storage 1020 may also store other computer readable instructions to implement an operating system, an application program, and the like. Computer readable instructions may be loaded in memory 1018 for execution by processing unit 1016, for example.

The term "computer readable media" as used herein includes computer storage media. Computer storage media includes volatile and nonvolatile, removable and non-removable media implemented in any method or technology for storage of information such as computer readable instructions or other data. Memory 1018 and storage 1020 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1012. Any such computer storage media may be part of device 1012.

Device 1012 may also include communication connection(s) 1026 that allows device 1012 to communicate with other devices. Communication connection(s) 1026 may include, but is not limited to, a modem, a Network Interface Card (NIC), an integrated network interface, a radio frequency transmitter/receiver, an infrared port, a USB connection, or other interfaces for connecting computing device 1012 to other computing devices. Communication connection(s) 1026 may include a wired connection or a wireless connection. Communication connection(s) 1026 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1012 may include input device(s) 1024 such as keyboard, mouse, pen, voice input device, touch input device, infrared cameras, video input devices, and/or any other input device. Output device(s) 1022 such as one or more displays, speakers, printers, and/or any other output device may also be included in device 1012. Input device(s) 1024 and output device(s) 1022 may be connected to device 1012 via a wired connection, wireless connection, or any combination thereof. In one embodiment, an input device or an output device from another computing device may be used as input device(s) 1024 or output device(s) 1022 for computing device 1012.

Components of computing device 1012 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1012 may be interconnected by a network. For example, memory 1018 may be comprised of multiple physical memory units located in different physical locations interconnected by a network.

Those skilled in the art will realize that storage devices utilized to store computer readable instructions may be distributed across a network. For example, a computing device 1030 accessible via network 1028 may store computer readable instructions to implement one or more embodiments provided herein. Computing device 1012 may access computing device 1030 and download a part or all of the computer readable instructions for execution. Alternatively, computing device 1012 may download pieces of the computer readable instructions, as needed, or some instructions may be executed at computing device 1012 and some at computing device 1030.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method, comprising:
    comparing a function associated with a computer program being executed to configuration data from a user created configuration file to determine whether the function is to be modified, the function specified within a callback sent from a runtime library, the configuration data identifying functions desired for modification; and
    responsive to determining that the function is to be modified:
        trapping the callback before delivery of the callback to a compiler associated with the computer program;
        injecting modifying intermediate language code from a file separate from the computer program into intermediate language code associated with the computer program to create modified intermediate language code, the modified intermediate language code comprising at least some of the intermediate language code and the modifying intermediate language code, the modified intermediate language code configured to perform a modified function when executed, the modified function comprising a modification of the function;
        modifying the callback with the modified intermediate language code to create a modified callback; and
        providing the modified callback, instead of the callback, to the compiler for compilation.

2. The method of claim 1, comprising running one or more injected modifying compiled code arguments in a same stack frame as the function.

3. The method of claim 1, the modifying intermediate language code comprising at least one of:
    prologue modification code;
    epilogue modification code; or
    arbitrary modification code.

4. The method of claim 1, comprising:
    acquiring the modifying intermediate language code from a stub assembly file.

5. The method of claim 4, comprising:
    compiling stub method code of the stub assembly file into an intermediate language associated with the intermediate language code to create the modifying intermediate language code.

6. The method of claim 4, the injecting comprising:
    copying an assembly metadata token for a stub method defined within the stub assembly file.

7. The method of claim 1, comprising:
    invoking the compiler to compile the modified intermediate language code, within the modified callback, into machine code.

8. The method of claim 1, comprising:
    invoking the compiler to run the modified function within a stack frame without altering a call stack of the computer program.

9. The method of claim 1, comprising:
    identifying a branch structure associated with the modifying intermediate language code; and
    preserving the branch structure within the modified intermediate language code.

10. The method of claim 9, the identifying comprising:
    parsing the modifying intermediate language code to create a directed graph; and
    evaluating the directed graph to identify the branch structure.

11. The method of claim 9, the branch structure corresponding to at least one of a branch or an exception handling block.

12. The method of claim 9, the preserving comprising:
    merging one or more instructions, pointed to by the branch structure, into the modified intermediate language code.

13. A system, comprising:
    one or more processing units; and
    memory comprising instructions that when executed by at least one of the one or more processing units implement a modification component configured to:
        compare a function associated with a computer program being executed to configuration data from a user created configuration file to determine whether the function is to be modified, the function specified within a callback sent from a runtime library, the configuration data identifying functions desired to be modified; and
        responsive to determining that the function is to be modified:
            trap the callback before delivery of the callback to a compiler associated with the computer program;
            inject modifying intermediate language code from a file separate from the computer program into intermediate language code associated with the computer program to create modified intermediate language code, the modified intermediate language code comprising at least some of the intermediate language code and the modifying intermediate language code, the modified intermediate language code configured to perform a modified function when executed;
            modify the callback with the modified intermediate language code to create a modified callback; and
            provide the modified callback, instead of the callback, to the compiler for compilation.

14. The system of claim 13, the modification component configured to:
    acquire the modifying intermediate language code from a stub assembly file.

15. The system of claim 14, the modification component configured to:
    compile stub method code of the stub assembly file into an intermediate language associated with the intermediate language code to create the modifying intermediate language code.

16. The system of claim 14, the modification component configured to:
    copy an assembly metadata token for a stub method defined within the stub assembly file.

17. The system of claim 13, the modification component configured to:

identify a branch structure associated with the modifying intermediate language code; and preserve the branch structure within the modified intermediate language code.

18. The system of claim 17, the branch structure corresponding to at least one of a branch or an exception handling block.

19. The system of claim 17, the modification component configured to:

merge one or more instructions, pointed to by the branch structure, into the modified intermediate language code.

20. A computer-readable device comprising a hardware processor and processor-executable instructions that when executed perform a method, comprising:

comparing a function associated with a computer program to configuration data to determine whether the function is to be modified, the function specified within a callback sent from a runtime library, the configuration data identifying functions desired for modification; and responsive to determining that the function is to be modified:

trapping the callback before delivery of the callback to a compiler associated with the computer program;

injecting modifying intermediate language code from a file separate from the computer program into intermediate language code associated with the computer program to create modified intermediate language code, the modified intermediate language code comprising at least some of the intermediate language code and the modifying intermediate language code, the modified intermediate language code configured to perform a modified function when executed, the modified function comprising a modification of the function;

modifying the callback with the modified intermediate language code to create a modified callback; and providing the modified callback, instead of the callback, to the compiler for compilation.

* * * * *